(12) United States Patent
Thiery et al.

(10) Patent No.: US 10,145,491 B2
(45) Date of Patent: Dec. 4, 2018

(54) SIDE LOAD FREE EGR VALVE ACTUATION

(71) Applicant: Hanon Systems, Daejeon (KR)

(72) Inventors: Christoph Thiery, Mannheim (DE);
Bernhard Klipfel, Karlsruhe (DE);
Manuel Schieker, Mannheim (DE);
Jens Schwindt, Mannheim (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/612,681

(22) Filed: Jun. 2, 2017

(65) Prior Publication Data

US 2017/0363225 A1 Dec. 21, 2017

(30) Foreign Application Priority Data

Jun. 10, 2016 (DE) .................... 10 2016 210 315

(51) Int. Cl.
*F16K 31/524* (2006.01)
*F16K 31/528* (2006.01)
(Continued)

(52) U.S. Cl.
CPC .......... *F16K 31/524* (2013.01); *F16K 31/528* (2013.01); *F16K 31/52408* (2013.01); *F02M 26/52* (2016.02); *F02M 26/68* (2016.02)

(58) Field of Classification Search
CPC . F16K 31/524; F16K 31/52408; F02M 26/52; F02M 26/68
(Continued)

(56) References Cited

U.S. PATENT DOCUMENTS 1,612,406 A * 12/1926 Weisgerber ............... F16K 3/26
251/250
2,791,206 A * 5/1957 Engemann ................ F01L 1/22
123/90.45
(Continued)

FOREIGN PATENT DOCUMENTS

DE 621553 11/1935
DE 102006018599 10/2007
(Continued)

OTHER PUBLICATIONS

Office Action issued in German Patent Application No. 102016210315.6, dated May 16, 2017.

*Primary Examiner* — John Bastianelli
(74) *Attorney, Agent, or Firm* — Norton Rose Fulbright US LLP

(57) ABSTRACT

A device for converting a rotational motion of a valve element into a translational motion of same having a valve element bearing-supported such that it is translationally movable along a translation axis, a cam element with a cam curvature. The cam element is rotatable about an axis of rotation, wherein connected with the valve element is a stem by means of which the valve element can be moved translationally along the translation axis and which comprises an engagement element in engagement with the cam curvature. The engagement element is braced from two sides of the cam element by the stem, and wherein, by rotation of the cam element about the axis of rotation, the engagement element is guided along the cam curvature such that the stem executes a translational motion whereby the valve element executes a translational motion.

10 Claims, 3 Drawing Sheets

(51) Int. Cl.
*F02M 26/52* (2016.01)
*F02M 26/68* (2016.01)

(58) Field of Classification Search
USPC ............. 251/251–263, 129.11–129.13;
123/568.23, 568.26
See application file for complete search history.

(56) References Cited

U.S. PATENT DOCUMENTS

| | | | | |
|---|---|---|---|---|
| 4,926,697 | A * | 5/1990 | Hardin | G01F 1/386 73/861.48 |
| 7,461,642 | B2 * | 12/2008 | Bircann | F02M 26/67 251/129.11 |
| 8,561,966 | B2 * | 10/2013 | Dohi | F16K 7/16 251/129.11 |
| 9,942,846 | B2 | 4/2018 | Sheth et al. | |
| 2005/0120987 | A1 * | 6/2005 | Inaba | F01L 13/0015 123/90.16 |
| 2009/0160275 | A1 * | 6/2009 | Keefover | F16H 25/14 310/83 |
| 2011/0291036 | A1 * | 12/2011 | Yamanaka | F16K 31/04 251/251 |
| 2014/0034029 | A1 * | 2/2014 | Sasaki | F16K 31/042 251/129.11 |

FOREIGN PATENT DOCUMENTS

| | | |
|---|---|---|
| DE | 102010025538 A1 | 12/2011 |
| KR | 20160016008 A | 2/2016 |
| KR | 20160096109 A | 8/2016 |
| WO | 2011076902 A1 | 6/2011 |

* cited by examiner

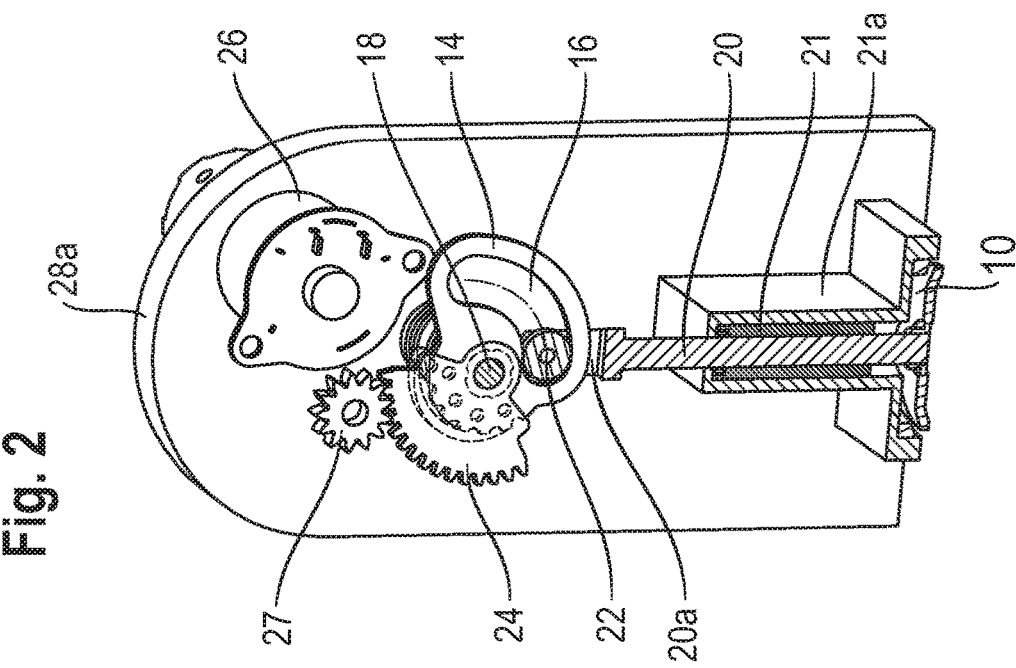
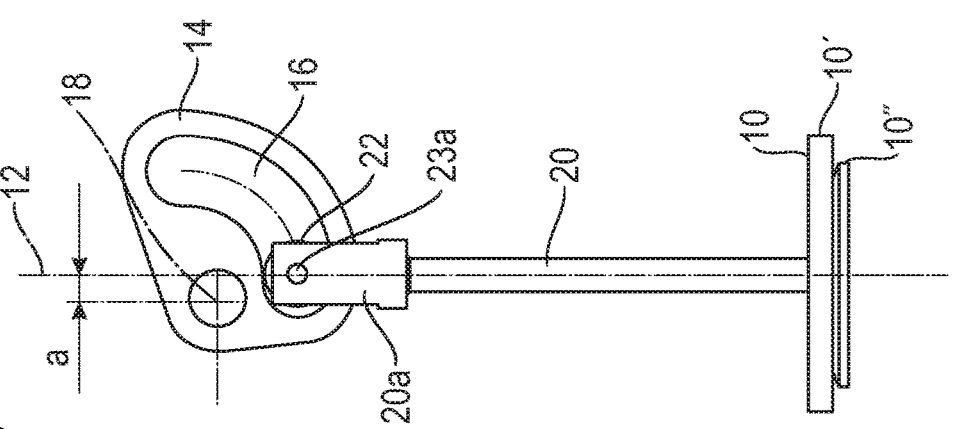

SIDE LOAD FREE EGR VALVE ACTUATION

This application claims priority from German Patent Application No. 102016210315.6 filed Jun. 10, 2016, which is hereby incorporated by reference in its entirety.

TECHNICAL FIELD

The present invention relates to a device for converting a rotational motion of a valve element into a translational motion of a valve element and an exhaust gas return valve with such a device.

PRIOR ART

Exhaust gas return valves are known within prior art that are utilized in combustion engines to return combustion exhaust gases back to the combustion chamber of the engine. This leads to the reduction of nitrogen oxides emission in the case of Diesel engines. In Otto engines this can moreover result in a reduction of the fuel consumption in the partial-load operational range.

In these exhaust gas return valves several different devices are utilized in order to move the valve element. An example of such a device is described in WO 2011/076902 A1. In the actuator described in this document the valve element is connected with a valve stem which, in turn, comprises an engagement element. This engagement element is guided in a connecting member implemented in a plate-shaped element. By swiveling this plate-shaped element, the stem can be moved back and forth whereby the valve element carries out opening and closing motions with respect to the valve seat.

A similar device is disclosed in DE 10 2010 025 538 A1. In this operating control device there is also provided a curved connecting member into which an engagement element engages. However, in this case it is not the engagement element that is connected with the stem but rather the object in which this connecting member is implemented. By moving the engagement element the connecting member is swiveled, which results in the shifting of the stem.

DESCRIPTION OF THE INVENTION

Building on WO 2011/076902 A1 the problem was recognized that the engagement element can be deformed. The cause of this deformation is apparent in FIG. 4 which schematically shows the functional principle of this actuator. In this Figure, 20' denotes the stem that is connected with an engagement element 23a'. This element projects from the stem 20' and is connected with a roller 23'. This roller 23' engages into the connecting member of a cam element 14'. However, due to the extension arm character of the engagement element 23a', a bending moment acts onto the engagement element 23a' which can lead to its canting in the connecting member or at least to its being subject to higher friction. Moreover, this can also lead to the tilting of the stem 20' which, at a close-fitting stem guidance, can lead to the jamming of the stem 20' in the stem guidance or at least to its experiencing increased friction therein.

The invention was carried out in view of the above described problems and intends at least to mitigate a portion of these problems.

The invention is defined by the device according to the present invention for the conversion of a rotational motion of a valve element into a translational motion of same. It is further defined by the exhaust gas return valve described herein. Preferred embodiments are also described herein.

According to claim 1 a device for converting a rotational motion into a translational motion of a valve element comprises the valve element itself. This element is bearing-supported such that it is translationally movable along a translation axis, which means it can be shifted along an axis. A valve element here is an element that is suitable to close a valve seat. The characteristic that the valve element is translationally movable along a translation axis does not preclude that—if applicable—minor tilting motions are possible.

The device comprises further a cam element with a cam curvature wherein the cam element is swivelable about an axis of rotation. This cam curvature is a curve implemented on or in the cam element and serves for guiding an engagement element to be described later, such that the valve element is moved translationally in order to open or close a valve.

The cam curvature can be implemented within the cam element, which means it can be a cam curvature implemented to extend through the cam element, which consequently has the form of a continuous hole. In such case an engagement element would penetrate this hole. However, it is sufficient if this cam curvature is implemented on an outer contour of the cam element. In such a case a suitably implemented preloading means must ensure that the engagement element is pressed against this cam curvature. The cam curvature typically has the shape of a spiral.

The rotatability of the cam element about the axis of rotation ensures that the engagement element comes into contact with several regions of the cam curvature during the swiveling of the cam element about the axis of rotation. The above described translational motion of the valve element is hereby carried out.

Connected to the valve element is a stem. Via this stem the valve element can be moved translationally along the translation axis. This stem comprises an engagement element which is in engagement with the cam curvature. Through the contact with the cam curvature this engagement element serves for converting a rotational motion of the cam element into a translational motion of the stem, and therewith of the valve element. The connection of the valve element with the stem can be a direct connection, that means the valve element can be connected with the stem without the insertion of further components. However, it is also feasible to insert further components between the valve element and the stem.

The engagement element is braced by the stem from two sides of the cam element. In contrast to prior art, this means the engagement element is not only braced on one side of the cam element but from two sides. These two sides of the cam element typically oppose one another. Since the bracing occurs from two sides, generating a bending moment at the stem can be avoided.

The device is further implemented such that the engagement element is guided along the cam curvature by a rotation of the cam element about the rotational axis. The stem executes hereby a translational motion whereby the valve element carries out a translational motion. As stated above, the guidance of the cam element can have several different forms. In particular, a guidance is conceivable in which the cam curvature is implemented on an outer contour of the cam element and the engagement element is pressed against this outer contour through suitably provided preloading elements.

As already stated above, the bilateral bracing of the engagement element leads to the avoidance of a bending moment. The above stated tilting of the engagement element and of the stem can hereby be prevented. Insofar the friction can be reduced. Moreover, it can be avoided that the device becomes jammed. The result of both is a device that is less prone to error and has a longer service life. Such implementation can also be produced more cost effectively due to its simple implementation.

It is of advantage for the cam element and the engagement element to be provided in one housing encompassing these components. This leads to the fact that these components become less readily contaminated which results in increased service life of the device. Electrical contacts can also be provided in this housing in order to supply a motor of the device with power. It is further of advantage for a motor driving the device to be provided on the side of the cam element and engagement element opposite with respect to the stem. This facilitates the manufacture of the device.

In the present case it is preferred for the cam curvature to be implemented within the cam element and to penetrate it. This involves an implementation already described above in which the cam curvature is implemented as a hole within the cam element. Through this hole penetrates the engagement element. Herein an implementation will often result in which the engagement element is braced by the stem in the form of a "Y", in which two arms of the stem are provided on both sides of the cam element. The corresponding implementation of the device leads to simplification of the structure of the device.

It is furthermore of advantage for the engagement element to extend from one side of the cam element to the opposing side of the cam element and for it to be braced on these two sides by the stem. This implementation results in the ability for the certain prevention of a bending moment. This bracing on opposite sides of the cam element leads in particular to the fact that the bending moment is less than in the case in which the bracing is not on opposite sides.

It is furthermore preferred for the axis of rotation of the cam element to be spaced apart with respect to the translation axis, if viewed along the axis of rotation of the cam element. Accordingly, the straight line, which describes the axis of rotation of the cam element, is spaced apart by a distance a (a>0) with respect to the straight line which describes the translation axis of the stem. It was found that such implementation leads to the fact that friction losses can be avoided.

It is furthermore of advantage for the cam element to be implemented unitarily with a toothed wheel element coupled to a motor such that the cam element can be rotated about the axis of rotation by the motor. This unitary implementation is an implementation in which the cam element is implemented together with the toothed wheel element from a single object, which means it does not involve two separate objects coupled with one another. Such an implementation is simple of manufacture and consequently leads to a cost-effective device for the conversion of a rotational motion of a valve element into a translational motion.

It is also feasible to couple the cam element with the motor via a gearing with several toothed wheels. This can be of advantage in order to have greater flexibility in the selection of the motor. Direct coupling is furthermore also feasible, i.e. for a toothed wheel to be directly connected with the motor, which drives the cam element directly.

It is, furthermore, preferred for the cam curvature to have the form of a segment of an involute to a circle. Such an involute to a circle describes a spiral with constant winding-turns spacing. This can be represented in polar coordinates as follows:

$$r(t)=a\sqrt{(1+t^2)} \quad \varphi(t)=t-\arctan(t)$$

Herein is t a run parameter, r(t) describes the radius of the spiral and φ(t) the associated angle. a is a parameter selected to describe the specific spiral. The expression that the cam curvature "has the shape of an involute to a circle" describes the characteristic that the center line of the cam curvature has this shape. Accordingly, the involute to a circle describes essentially the loci through which the center point of the engagement element moves. Such a formation of the device is a comparatively low-loss formation. Moreover, such form has advantageously a linear characteristic. Furthermore, a transverse-force-free force transmission onto the stem over the entire course results.

It is furthermore preferred for the cam curvature to have the form of a logarithmic spiral. The form of the cam curvature describes herein also essentially the loci through which the center point of the engagement element moves. A logarithmic spiral can be mathematically described as follows:

$$r(\varphi)=ac^{k\varphi}, \quad \varphi \in \mathbb{R},$$

In this equation r describes the distance of a point on the spiral from the center point of the logarithmic spiral and φ describes the associated angle which can be greater than 2π or 360°. The variables a and k are parameters describing specific logarithmic spirals and, accordingly, can differ with different logarithmic spirals.

The logarithmic spiral can, in other words, be defined as a spiral in which with each rotation about its center point the distance from this center point changes by the same factor. Such an implementation of the device is a comparatively low-loss implementation. In particular in combination with a lateral offset of the stem with respect to the rotational point of the cam element in the direction of the cam curvature (cf. subsequent description relating to FIG. 1) such implementation leads further to a nearly transverse-force-free force transmission onto the stem. The force transmission is in particular transverse-force-free only at that point at which it is especially advantageous, namely when the valve is closed or nearly closed. This leads to advantages since in the closed state adhesions may occur, and at this point high opening forces can be applied due to the cam curvature in the form of a logarithmic spiral. The service life is hereby increased. Through the advantageous nonlinear characteristic of the logarithmic spiral in the further course of the opening motion a greater upstroke can simultaneously be generated which is good for the opening characteristic.

The cam curvature can alternatively be provided in the form of an Archimedes spiral whose form is very close to that of an involute to a circle such that the above named advantages are also achieved. In particular, through an Archimedes spiral a nearly transverse-force-free force transmission is feasible.

Supplementarily to all described forms of a cam curvature it may be stated that such a cam curvature obtains its advantages even without all the support of the engagement element from two sides by the stem.

It is furthermore preferred for the engagement element to comprise a roller guided on or in the cam curvature, with the roller being enabled to rotate with respect to the stem. Such an implementation of the device has only low friction losses.

It is in this case especially advantageous if the roller is guided rotatably by a shaft in which at least one end and, preferably, both ends are fixedly connected with the stem. Through such a fixed connection, which means through a connection that cannot be released at all or only with the use of tools, it can be prevented that the engagement element becomes unintentionally detached from the stem. The error proneness of the device is insofar decreased.

It is furthermore of advantage if a center axis of the stem intersects, parallel to the translation axis, the surface of the cam element through which the cam curvature is formed. Stated differently, the center axis of the stem is shaped such that its extension intersects the surface of the cam element. The result in this case is that a bending moment, which could act onto the stem, is here also avoided, which avoids deformation of the stem.

In an embodiment the valve is an exhaust gas return valve with a device as described above. In this exhaust gas return valve the valve element is movable through a rotation of the cam element between a contact position, in which the valve element is in contact on the valve seat and thus closes the valve, and a clearance position, in which the valve element is spaced apart from the valve seat and consequently the valve is open. Such an exhaust gas return valve can be employed in a motor vehicle and also in any other application of exhaust gas return valves, and comprises, if applicable, the above stated advantages accordingly.

BRIEF DESCRIPTION OF THE DRAWING

FIG. 1 is a diagram to illustrate the functional principle of the present invention.

FIG. 2 is a sectional view through a corresponding device.

DETAILED DESCRIPTION OF THE FIGURES

Figure 2A:
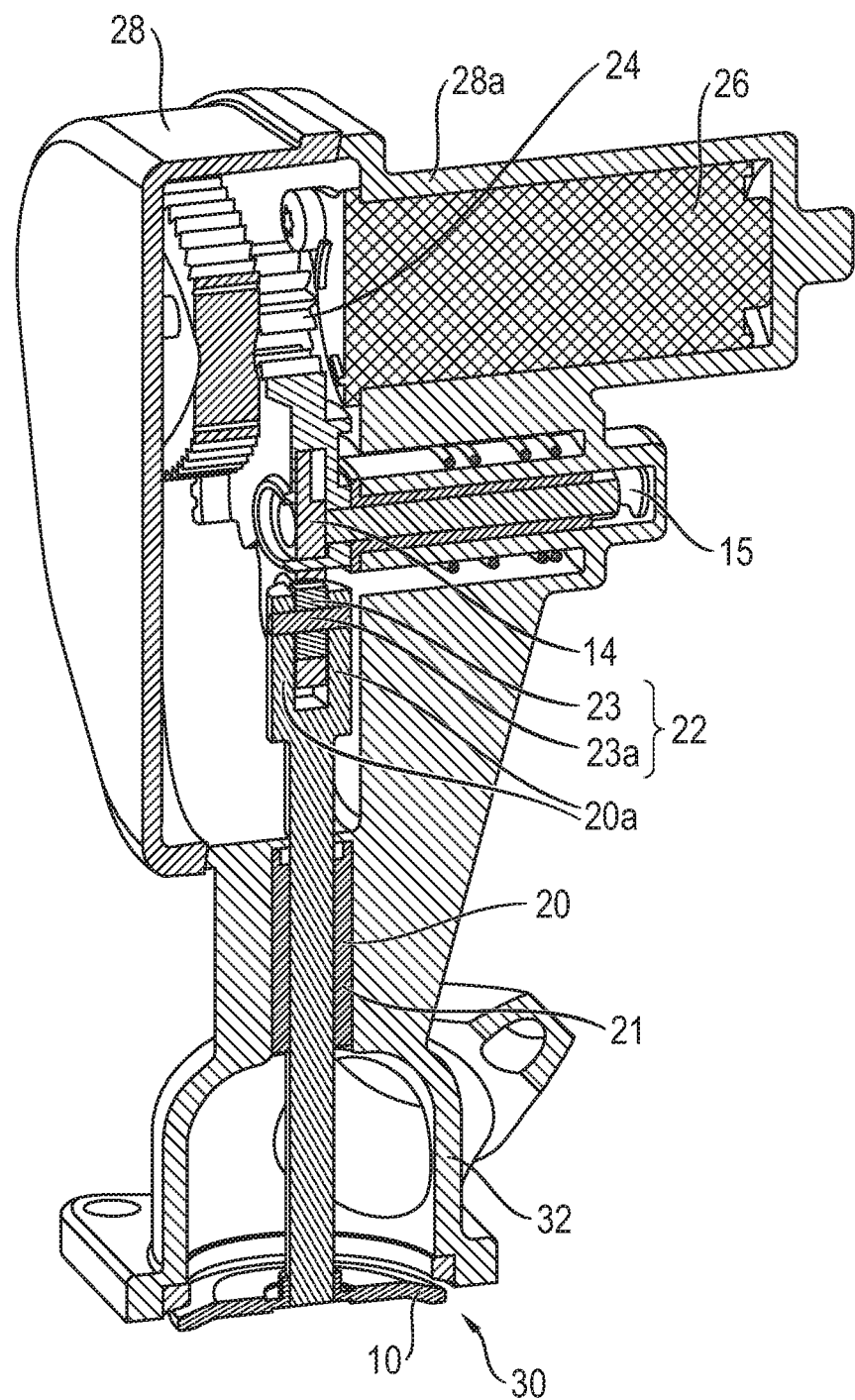
FIG. 2a is a sectional view through the device according to FIG. 2 when used in an exhaust gas return valve.

In the following the present invention will be described with reference to FIGS. 1 to 4.

FIG. 1 is a diagram describing the functional principle of the present invention. A valve element 10, in the present case implemented in two parts of a sealing ring 10" and a metal bracing plate 10', is secured on a stem 20. This stem 20 is implemented at its upper end in the form of a Y with two arms 20a. These two arms 20a include between them an engagement element 22 which is rotatably bearing-supported by the arms 20a. In the present case this bearing support is implemented by providing two throughholes and inserting a pin 23a into these throughholes. This pin 23a bearing-supports a roller 23 capable of rotating about the pin 23a. The engagement element 22 engages into the cam curvature 16 of a cam element 14 which, in the present case, is formed by a metal plate. However, it can also be formed by any other plate with correspondingly high rigidity. This cam element 14 is rotatably bearing-supported about an axis of rotation 18. With respect to a translation axis 12 of stem 20, this axis of rotation 18 is spaced apart by a distance a drawn in FIG. 1. When the cam element 14 is swiveled about the axis of rotation 18 the engagement element 22 comes into engagement with several regions of the cam curvature 16 whereby the stem 20 is moved back and forth along the translation axis 12. This leads to the opening and closing of a valve connected with this device.

The above described distance a, which denotes the offset of stem 20 from the axis of rotation 18 of cam element 14 in the direction of cam curvature 16, together with the above described special forms of the cam curvature 16, namely an involute to a circle, logarithmic or Archimedes spiral, yields the advantage of an, at least regional and/or nearly transverse-force-free, force transmission onto the stem. In this context transverse forces are to be understood forces in the lateral direction according to FIG. 1.

FIG. 2 shows the device according to FIG. 1 after installation. In addition to the elements of FIG. 1, herein is also shown a motor 26 coupled with a toothed wheel element 27. This toothed wheel element 27 meshes with a toothed wheel element 24. The toothed wheel element 24, in turn, is connected with the cam element 14. Through a rotation of toothed wheel element 24 the cam element 14 is rotated about its axis of rotation 18. As already stated above, this results in the motion of valve element 10. Furthermore is provided a guidance 21 that guides the stem 20. This guidance 21, in the form of a sleeve, is received in a housing 21a. By providing such a guidance, in particular a guidance with low friction coefficient, the stem 20 can be guided securely and at low loss. This avoids a tilting of the stem 20 with respect to the translation axis 12. Thereby that the guidance 21 has only low frictional resistance, friction losses can be avoided.

FIG. 2a shows FIG. 2 in a different sectional view. This implementation is specifically intended for an exhaust gas return valve 30 that comprises an exhaust gas return port fitting 32. In FIG. 2a the bilateral bracing of the engagement element 22 is clearly visible, which is formed by a pin 23a and a roller 23. The pin 23a is held by arms 20a. In the present case it can also be seen that the cam element 14 is guided by an axle 15 which penetrates through a hole in cam element 14. This axle 15 is rotatably bearing-supported. Further provided is a housing 28, provided on the housing 28a and covering the toothed wheel mechanism.

Figure 4:
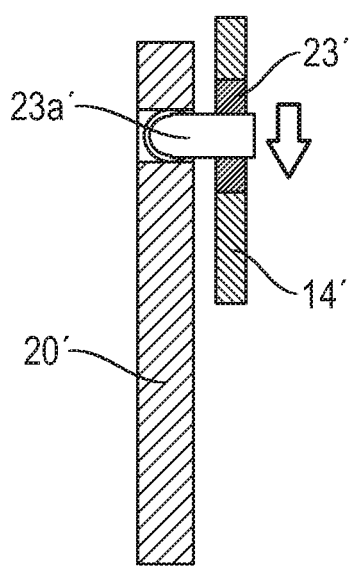
FIG. 4 shows a detail corresponding to FIG. 3 according to prior art.
Figure 3:
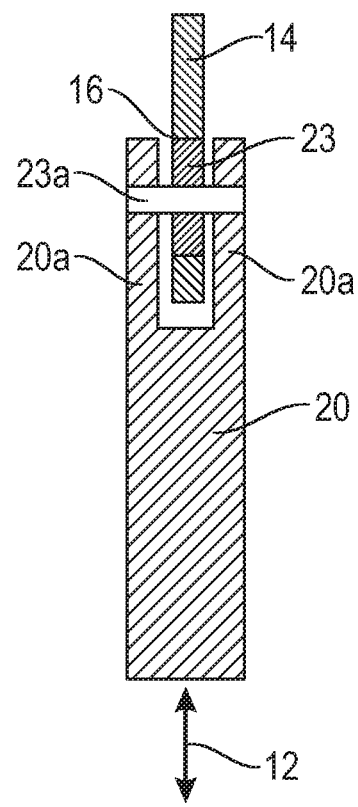
FIG. 3 is a sectional diagram of a detail of the device according to FIG. 1.

The advantages of the present invention are more clearly evident by comparing FIGS. 3 and 4. FIG. 4 shows, as already stated previously, a segment from an exhaust gas return valve of prior art, while FIG. 3 shows a corresponding segment of an exhaust gas return valve according to the invention.

Through these two arms 20a of stem 20, pin 23a, fitted into these arms 20a, is maintained from both sides of the cam element 14. On this pin 23a a roller 23 is provided which is rotatable about pin 23a and engages into the cam curvature 16 of cam element 14. The roller 23 is guided through this engagement by the cam element 14, which, as already stated above, leads to the fact that the valve element 10 can move up and down during the swiveling of cam element 14.

In contrast to FIG. 4, which only shows a one-sided bracing of pin 23a', pin 23a is braced on both sides of cam element 14. As already stated above, this leads to the avoidance of a bending moment acting onto pin 23a and onto stem 20. This is of advantage in terms of free movement and reliability of the exhaust gas return valve or the device for converting a rotational motion into a translational motion of a valve element (i.e. of an actuator).

The invention claimed is:

1. A device for converting a rotational motion of a valve element into a translational motion of same with:
    a valve element bearing-supported such that it is translationally movable along a translation axis,
    a cam element with a cam curvature, wherein the cam element is rotatable about an axis of rotation, wherein connected to the valve element is a stem by means of which the valve element can be moved translationally along the translation axis and which comprises an engagement element which is in engagement with the cam curvature, wherein the engagement element is braced from two sides of the cam element through the stem, wherein by rotation of the cam element about the axis of rotation the engagement element is guided along the cam curvature such that the stem executes a translational motion whereby the valve element executes a translational motion, wherein the cam element is implemented unitarily with a toothed wheel element which is coupled with a motor such that the cam element can be rotated about the axis of rotation through the motor, and wherein the axis of rotation of the cam element is disposed between the coupling point of the toothed wheel element and the motor and the cam curvature.

2. The device as in claim 1, wherein the cam curvature is implemented within the cam element and penetrates therethrough.

3. The device as in claim 1, wherein the engagement element extends from one side of the cam element to the opposite side of the cam element and is braced on these two sides by the stem.

4. The device as in claim 1, wherein the axis of rotation of the cam element is spaced apart with respect to the translation axis when viewed along the direction of the axis of rotation of the cam element.

5. The device as in claim 1, wherein the cam curvature has the form of an involute to a circle.

6. The device as in claim 1, wherein the cam curvature has the form of a logarithmic spiral or an Archimedes spiral.

7. The device as in claim 1, wherein the engagement element comprises a roller which is guided on or in the cam curvature, wherein the roller can rotate with respect to the stem.

8. The device as in claim 7, wherein the roller is guided through a shaft wherein at least one end is fixedly connected with the stem.

9. The device as in claim 1, wherein the engagement element is braced by the stem such that a center axis of the stem intersects, parallel to the translation axis, the surface of the cam element through which the cam curvature is formed.

10. An exhaust gas return valve with a device as in claim 1 with a valve seat, wherein the valve element through rotation of the cam element is movable between a contact position, wherein the valve element is in contact on the valve seat, and a clearance position, wherein the valve element is spaced apart from the valve seat.

* * * * *